UNITED STATES PATENT OFFICE.

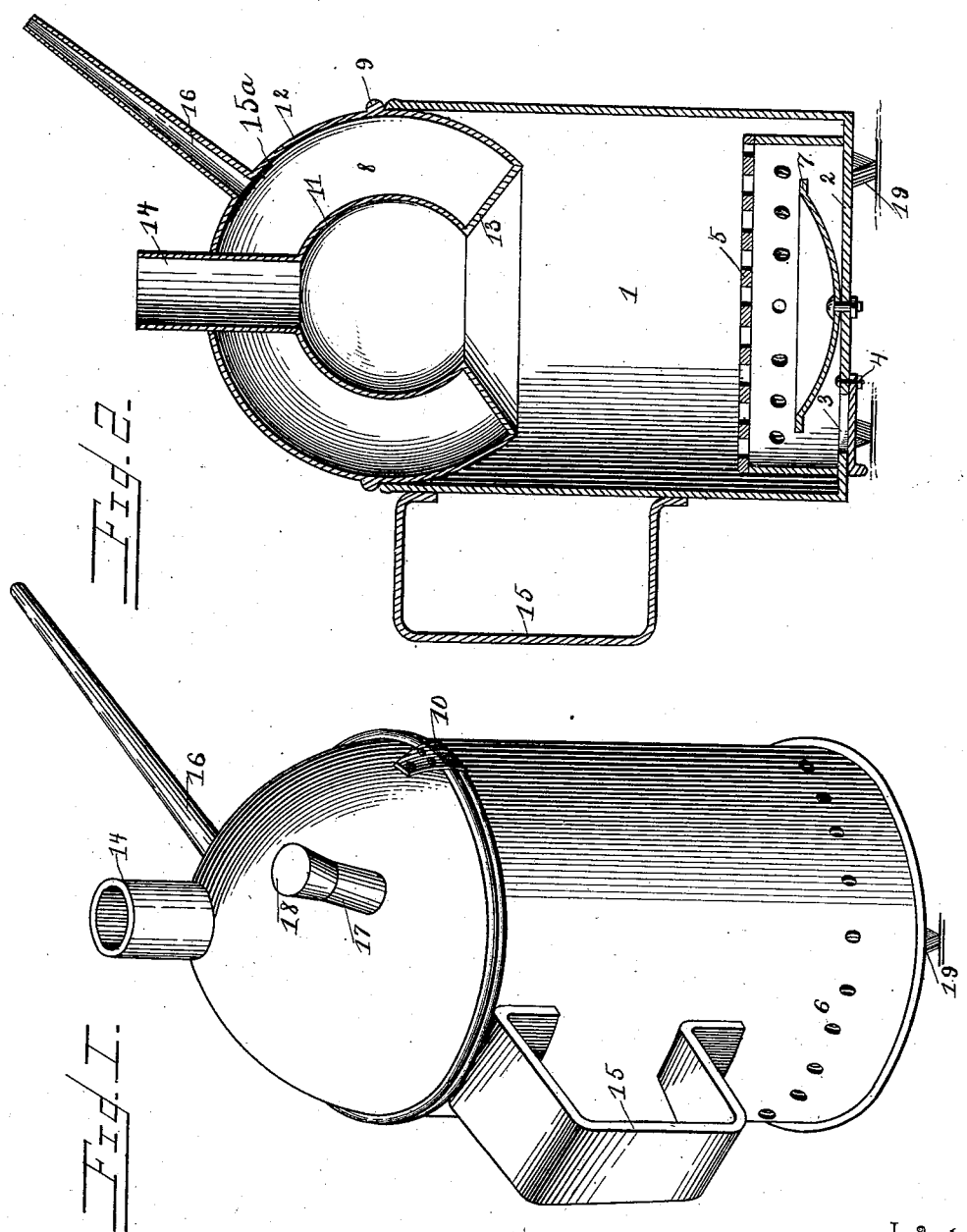

ELI THOMPSON PRIEST, OF RISING STAR, TEXAS.

INSECT-DESTROYER.

SPECIFICATION forming part of Letters Patent No. 601,168, dated March 22, 1898.

Application filed May 27, 1897. Serial No. 638,459. (No model.)

*To all whom it may concern:*

Be it known that I, ELI THOMPSON PRIEST, a citizen of the United States, residing at Rising Star, in the county of Eastland and State of Texas, have invented a new and useful Insect-Destroyer, of which the following is a specification.

The invention relates to improvements in insect-destroyers.

The object of the present invention is to improve the construction of that class of devices which generate steam for the destruction of insects and to provide a simple, strong, and durable insect-destroyer which will be capable of containing a large quantity of water and of presenting a large heating-surface, whereby steam is quickly generated.

The invention consists in the construction and novel combination and arrangement of parts, as hereinafter fully described, illustrated in the accompanying drawings, and pointed out in the claims hereto appended.

In the drawings, Figure 1 is a perspective view of an insect-destroyer constructed in accordance with this invention. Fig. 2 is a central vertical sectional view.

Like numerals of reference designate corresponding parts in both figures of the drawings.

1 designates a cylindrical fire-pot constructed of suitable metal and preferably having its bottom 2 integral with the sides and provided with an opening 3, which is normally covered by a slide 4, adapted to permit ashes to be readily removed without necessitating the removal of a grate 5. The grate 5 is detachably arranged within the fire-pot 1, which is provided at a point below the grate with a series of draft-openings 6.

The necessary heat may be obtained by placing live coals on the grate 5, which may be readily removed when burned out; but, if desired, ashes saturated with coal-oil may be placed within a concavo-convex pan 7, which is centrally secured to the upper face of the bottom 2 of the fire-pot 1. The pan 7 will enable coal-oil to be safely employed as a fuel, and an insect-destroyer equipped with a grate and a pan may use either live coals or coal-oil. The diameter of the pan 7 is less than that of the fire-pot in order to provide an intervening annular space between the periphery of the pan and the walls of the fire-pot to receive the annular supporting-flange of the grate.

A spherical boiler or steam-generator 8 is arranged at the top of the fire-pot and extends partially within the same, being provided with an exterior supporting-rib 9, which rests upon the upper edges of the fire-pot. The boiler or generator, which is connected with the fire-pot by a hinge 10, consists of inner and outer substantially spherical shells 11 and 12, a conical bottom piece 13 connecting the shells at that point, and a cylindrical tube or chimney 14 connecting the inner and outer shells at the top and extending above the boiler or generator. The opening of the outer shell 12 is of sufficient diameter to permit the inner shell or lining to be readily passed through it in assembling the parts, and the inner faces of the conical bottom piece, inner shell, and chimney provide a large area of heating-surface, and the boiler or generator, which has a large capacity for water, thoroughly exposes it to the action of the heat and steam is quickly generated.

The fire-pot is provided with a handle 15, and the boiler or generator is provided at a point diametrically opposite the handle with a discharge-spout 16, and the hinge is arranged at one side of the device, so that there is no liability of the boiler or generator swinging outward in handling the device.

The boiler is provided with a strainer $15^a$, preferably constructed of wire-gauze and soldered or otherwise secured to the inner face of the outer shell, as clearly illustrated in Fig. 2 of the accompanying drawings. The strainer covers the inner end of the spout and prevents the same from becoming clogged and interfering with the discharge of the steam through accumulation in the boiler.

The spout, which is preferably constructed tapering, as shown, is adapted to receive a tube or hose when the device is constructed on a large scale. The hose will enable steam to be conveniently sprayed upon the ceiling or walls of a room and enables the device to be easily manipulated when it is too heavy to handle with one hand. A filling-tube 17 is provided for introducing water into the boiler or generator, and this tube is normally kept closed by a plug or stopper 18.

The fire-pot is provided with legs 19, which support the bottom above a carpet or other supporting-surface, so that the device may be rested on a table, chair, or the like without injuring the furniture.

The device is used by moving the spout along crevices in furniture, and steam is injected into the same, quickly destroying bed-bugs and other insects.

It will be seen that the insect-destroyer is simple, strong, and durable, that the boiler or steam-generator has a large capacity for water and at the same time exposes its contents to a large amount of heating-surface, and that either live coals or coal-oil may be employed as a fuel.

What I claim is—

1. An insect-destroyer comprising a fire-pot, and a boiler or generator composed of inner and outer spherical shells, the conical bottom piece connecting the inner and outer shells at the base, and the chimney-tube connecting them at the top, said boiler or generator being provided with a discharge-spout, substantially as described.

2. An insect-destroyer comprising a fire-pot, a boiler or generator mounted at the top of the fire-pot, a concave pan centrally fixed to the bottom of the fire-pot and designed to receive ashes or similar material, saturated with oil, to provide an oil-burner, said pan being of less diameter than the fire-pot and forming an intervening annular space between its periphery and the walls of the fire-pot, and a removable grate located above the pan and provided at its periphery with a depending annular supporting-flange located in the space between the pan and the walls of the fire-pot, substantially as and for the purpose described.

In testimony that I claim the foregoing as my own I have hereto affixed my signature in the presence of two witnesses.

ELI THOMPSON PRIEST.

Witnesses:
W. S. DANIEL,
GEO. W. BOLTON.